March 25, 1969   P. W. HAAIJMAN ET AL   3,434,886

PRIMARY CELL

Filed May 17, 1966

INVENTORS
PIETER W. HAAIJMAN
MARINUS D. WIJNEN
JOHANNES H. T. HENGST

BY *Frank R. ...*
AGENT

United States Patent Office 3,434,886
Patented Mar. 25, 1969

3,434,886
PRIMARY CELL
Pieter Willem Haaijman, Marinus Dirk Wijnen, and Johannes Hubertus Theodorus Hengst, Emmasingel, Eindhoven, Netherlands, assignors to North American Philips Company, Inc., New York, N.Y., a corporation of Delaware
Filed May 17, 1966, Ser. No. 550,708
Claims priority, application Netherlands, June 29, 1965, 6508307
Int. Cl. H01m 15/04, 19/00
U.S. Cl. 136—93                                6 Claims

ABSTRACT OF THE DISCLOSURE

A primary cell employing a liquid electrolyte and a soluble hypochlorite as a depolarizer. In a preferred embodiment a silver plated nickel electrode is employed and the electrolyte and depolarizer are separated by a porous ion-selective diaphragm.

Figure 1:
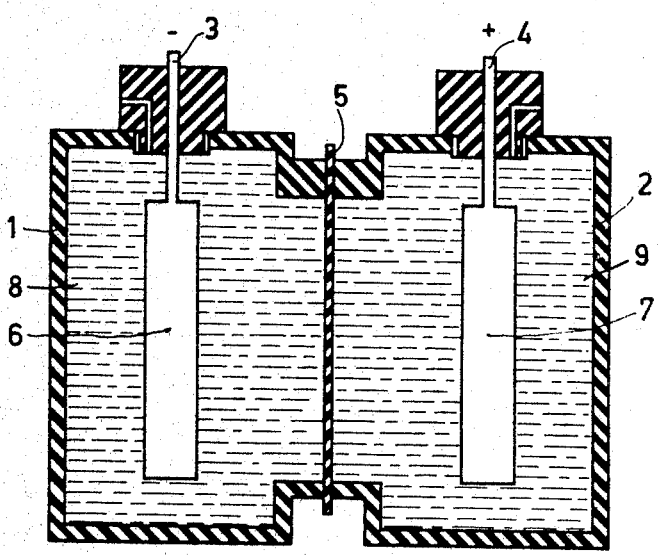

The invention relates to a primary cell containing a water-soluble depolarizer and an electrolyte dissolved in water, the depolarizer and the electrolyte being spaced by a separator.

In a known primary cell an electrode of an electronegative metal, for example Zn or Mg, is in contact with liquid electrolyte solution, and an indifferent electrode is in contact with an aqueous depolarizer mass which contains a water-soluble salt serving as a depolarizer. The depolarizer anion is in electrochemical equilibrium with a reduced form of the anion, while depolarizer mass is separated from the liquid electrolyte by means of a separator. It is the purpose of this separator to keep the depolarizer ions separated from the eletcrode of the electronegative metal.

Such primary cells employing a soluble depolarizer do not have a particularly favorable life when not in use as compared with, for example, the known manganese dioxide cell. Moreover, its load capacity is not particularly good. This means that when the current consumption is small the discharge curve is rather flat and a high efficiency is obtained. However, when the load becomes somewhat higher this rapidly becomes considerably worse.

A principal object of this invention is to provide a primary cell which has a particularly high load capacity and consequently shows an excellently flat discharge curve also when the discharge currents are high.

Another object of the invention is to provide a primary cell which can be regenerated by replacing the consumed depolarizing solution and the liquid electrolyte solution.

These and further objects of the invention will appear as the specification progresses.

In accordance with the invention, we employ as a depolarizer, a hypochlorite which results in a battery having a good load capacity and which can be readily regenerated by replacing the depolarizer solution. This can be repeated up to at least 16 times without having to replace the metal eletcrode or the separator, provided that the quantity by weigh of the metal electrode is sufficient. This is particularly attractive due to the ready availability and low price of hypochlorite and the electrolyte, which, for example, consists of an alkali hydroxide.

According to a preferred embodiment of the invention the best load capacity is obtained if a small quantity of metallic silver is provided on the surface of the indifferent electrode. For this purpose, for example, a nickel electrode may be very slightly silver-plated. In this case the silver very likely serves as a potential mediator, so that then the following reactions could take place at that electrode:

$$2\theta + Ag_2O + H_2O \rightarrow 2Ag + 2OH^- \quad (E_0 = 0.344 \text{ v.})$$
$$OCl^- + Ag \rightarrow Ag_2O + Cl^-$$

If this electrode is combined with a zinc electrode in an alkaline medium, a cell E.M.F. of 1.53 volt is measured. Since the normal E.M.F. of $Zn/MnO_2 = -1.245$ volt, the calculated value for this cell E.M.F. is 1.589 volt, which is in reasonable agreement with the measured value.

Other catalysts are nickel, cobalt or copper. Although with these catalysts a somewhat higher E.M.F. is obtained than when Ag is used, as a catalyst, the load capacity is lower.

In a preferred embodiment of the primary cell according to the invention, an ion-selective diaphragm is used as a separator which has a negative charge fixed in the diaphragm, at least on one side. As a result of this, the permeance of the depolarizer is inhibited so that the life, when not in use, as a rule, is somewhat lengthened. The diaphragm may be, for example, an organic macromolecular ion-exchanger, i.e., a type of insoluble polymerization product, the skeleton of which comprises a given part of polar, in this case negative, groups in a chemically bound form.

An ion-selective diaphragm which can likewise be used, and is excellent, consists of a porous support impregnated with barium sulfate precipitate. Such a diaphragm is obtained if a hydrophilic foil is arranged between two compartments one of which contains $Ba^{++}$-ions and the other contains $SO_4^{--}$ ions. In the foil $BaSO_4$ is precipitated while a diaphragm potential is built up as a result of which a positive charge is present on the $Ba^{++}$-side of the diaphragm and a negative charge is present of the $SO_4^{--}$ side. We have found that the combination of such a diaphragm with a hypochlorite as a depolarizer forms a particularly attractive base for a primary cell.

The diaphragm support is, preferably, a foil of porous polyvinyl-chloride.

An alkali-hydroxide is preferably used as an electrolyte. When a diaphragm is used, which is impregnated with $BaSO_4$-percipitate, the electrolyte necessarily contains in addition some $SO_4^{--}$ ions and the depolarizer solution some $Ba^{++}$ ions since otherwise the permeance loss of the depolarizer is too high. Without the $Ba^{++}$ and the $SO_4^{--}$ ions this permeance loss, expressed as a decrease in the number of ampere hours supplied, is 10% in 4 hours. If these ions are present, this loss is only 5% in 1 week.

As a metal electrode, zinc, aluminum, lead or magnesium may be used.

It is of advantage, particularly with a high load on the cell if the liquid in the depolarizer compartment is slightly stirred when current is drawn. This prevents the occurrence of a concentration polyarization which would impede the optimum attainable efficiency. The natural vibration of an electric motor is sufficient for this purpose, and this can be realized by connecting in the housing of the cell rigidly to the motor. The efficiency of a cell, calculated on the basis of hypochlorite, then increases, for example, from 60% to 75%.

Figure 2:
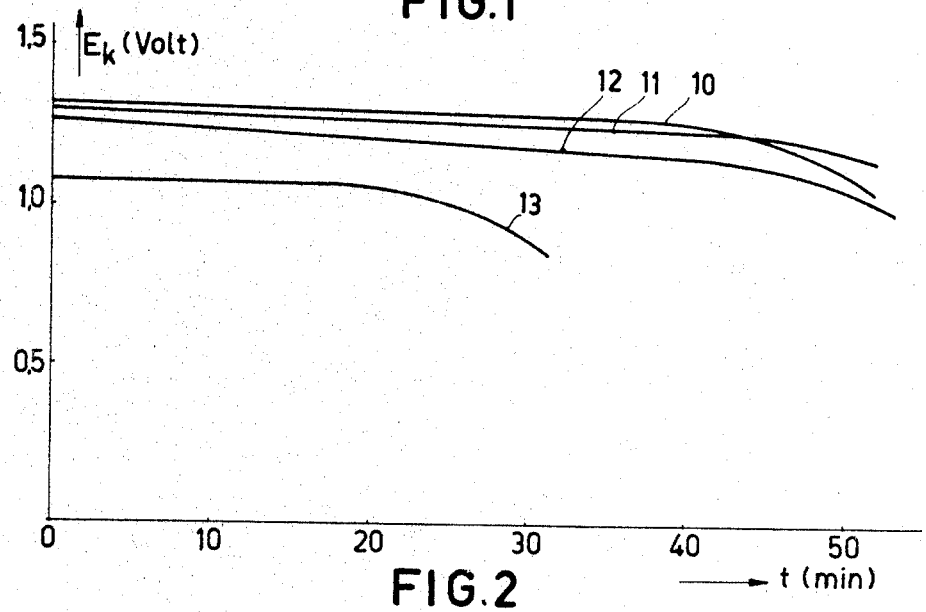

The invention will now be described with reference to the accompanying drawing in which FIG. 1 is a sectional view of a cell according to the invention; and FIG. 2 is a graph with several curves corresponding to different examples showing the variation of the voltage of the cell with time.

As shown in FIG. 1, the cell comprises an envelope consisting of two compartments 1 and 2 which houses electrodes 6 and 7 with terminals 3 and 4. These compartments are clamped together with their open sides closed by a separator 5. The electrode of the electronegative metal 6 surrounded by liquid electrolyte 8 is arranged in the left-hand compartment; the hypochlorite solution 9 and the indifferent electrode 7 are arranged in the righthand compartment. The indifferent electrode 7 consists of a nickel gauge having a surface area of 16 sq. cm. which is slightly silver-plated, the other electrode 6 consists of a perforated zinc-plate likewise having a surface area of 16 sq. cm. The separator 5 consists of porous polyvinylchloride foil, commercially available under the trade name "Porvic M," the surface area of which likewise was 16 sq. cm.

50 ml. of hypochlorite solution, were used as the starting material for the preparation of the depolarizer solution. This soltuion contained 10 gm. of active chlorine per 100 ml. Approximately 15 ml. of this solution corresponding to a power of approximately 0.75 amp hours were introduced into the depolarizer compartment of the cell; the electrolyte compartment was filled with 15 ml. of a KOH (4 N or 7 N).

The following examples described in connection with FIG. 2 illustrate the effect of the depolarizer in a battery according to the invention.

(1) The depolarizer compartment container the above hypochlorite solution and the electrolyte compartment contained a 7 N KOH solution. The life of this cell, when not in use, is rather small as a result of permeance loss. Curve 10 in which the variation of the terminal voltage ($E_K$) is stated as a function of time, relates to the discharge of the cell drawing 730–950 milliamps. The efficiency of this cell is 90%. The measurements to which the curves relate were carried out on freshly composed cells.

(2) Curve 11 relates to a cell which differs from that according to Example 1 in that KOH to a normality of 4 was added to the hypochlorite solution. During the measurement 820–865 milliamps were drawn from the cell which showed an efficiency of 77%.

(3) To the depolarizer solution consisting of hypochlorite with 4 N KOH were added per 7.5 ml. of a saturated $BaCl_2$-solution (50 ml.). A slight precipitate was formed from which $K_2SO_4$ was filtered and this precipitate was added to the liquid electrolyte consisting of 7 N KOH until saturation. Within a few minutes an ion-selective $BaSO_4$-precipitate was formed in the polyvinyl chloride diaphragm. The cell thus constructed showed a discharge curve 12 while drawing 650 to 750 milliamps. The efficiency was 82%.

(4) If 1350–1510 miliamps were drawn from the cell according to Example 2, a discharge curve 13 was measured as denoted in FIGURE 2. In this case the efficiency was 77%.

While we have described the invention with reference to specific embodiments and applications thereof, other modifications will be apparent to those skilled in this art without departing from the spirit and scope of the invention which is defined in the appended claims.

What is claimed is:

1. A primary cell comprising a housing, a first electrode within said housing in contact with a liquid electrolyte, a second electrode within said housing in contact with an aqueous depolarizer mass comprising a water soluble hypochlorite salt, and means spaced from said electrodes separating said depolarizer mass from the liquid electrolyte.

2. A primary cell as claimed in claim 1, in which a catalyst is provided on the surface of said electrode in contact with the depolarizer mass.

3. A primary cell as claimed in claim 1, in which a small quantity of metallic silver is provided on the surface of said electrode in contact with the depolarizer mass.

4. A primary cell as claimed in claim 1, in which the separating means comprises an ion-selective diaphragm which contains at least on one side thereof a negative charge fixed in the diaphragm.

5. A primary cell as claimed in claim 4, in which the ion-selective diaphragm consists of a diaphragm support impregnated with barium sulphate precipitate, the liquid electrolyte contains $SO_4^{--}$ ions, and the depolarizer solution contains $Ba^{++}$ ions.

6. A primary cell as claimed in claim 5, in which the diaphragm support is porous polyvinyl chloride.

References Cited

UNITED STATES PATENTS

| | | | |
|---|---|---|---|
| 3,355,328 | 11/1967 | Meyers et al. | 136—100 |
| 3,378,408 | 4/1968 | Hamlen et al. | 136—100 |
| 185,288 | 12/1876 | Brush | 136—137 |
| 1,771,190 | 7/1930 | Polcich | 136—83 |
| 2,514,415 | 7/1950 | Rasch | 136—146 |
| 2,700,063 | 1/1955 | Manecke | 136—93 |
| 3,069,488 | 12/1962 | Schmier | 136—137 |
| 3,129,118 | 4/1964 | Wilke et al. | 136—100 |

OTHER REFERENCES

Hackh's Chemical Dictionary, 3rd edition, pp. 428 and 608.

WINSTON A. DOUGLAS, Primary Examiner.

C. F. LE FEVOUR, Assistant Examiner.

U.S. Cl. X.R.

136—100, 137